W. J. Nace Assd. to
NACE & HAFER.

Stove Pipe Scraper.

PATENTED
NOV 26 1867

71500

INVENTOR.
W. J. Nace
By Knight Bros
Attys

Attest.
James H. Layman
Samuel Knight

United States Patent Office.

WARREN J. NACE, OF TIPPECANOE CITY, OHIO, ASSIGNOR TO HIMSELF AND GEORGE L. HAFER, OF THE SAME PLACE.

Letters Patent No. 71,500, dated November 26, 1867.

---

DEVICE FOR CLEANING STOVE-PIPES.

---

The Schedule referred to in these Letters Patent and making part of the same.

---

TO WHOM IT MAY CONCERN:

Be it known that I, WARREN J. NACE, of Tippecanoe City, Miami county, Ohio, have invented a new and useful Stove-Pipe Scraper; and I hereby declare the following to be a full, clear, and exact description thereof, reference being had to the accompanying drawings, making part of this specification.

My invention relates to a peculiarly-formed and arranged scraper, within a stove-pipe, for cleansing the interior of soot, ashes, or other accumulations.

Figure 1:
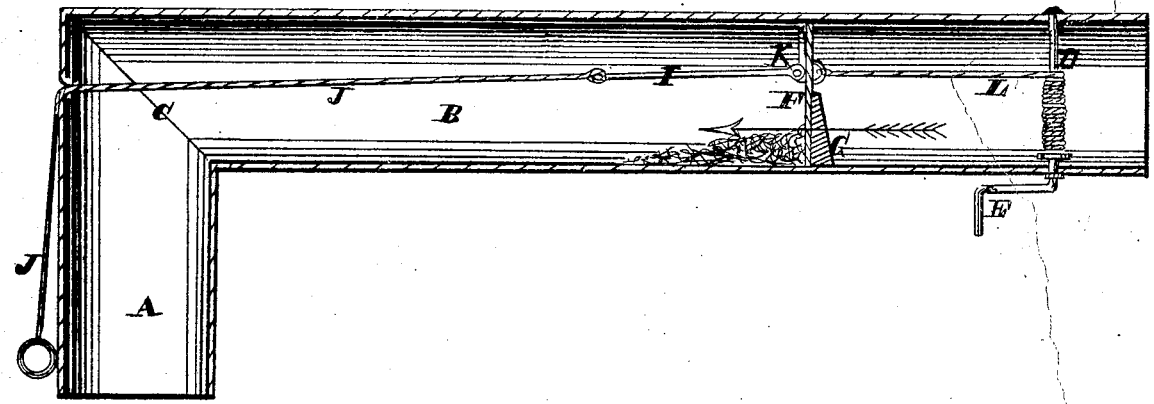
Figure 1 is an axial section of a stove-pipe, within which my scraper is shown in the act of disengaging and removing the soot, &c.
Figure 2:
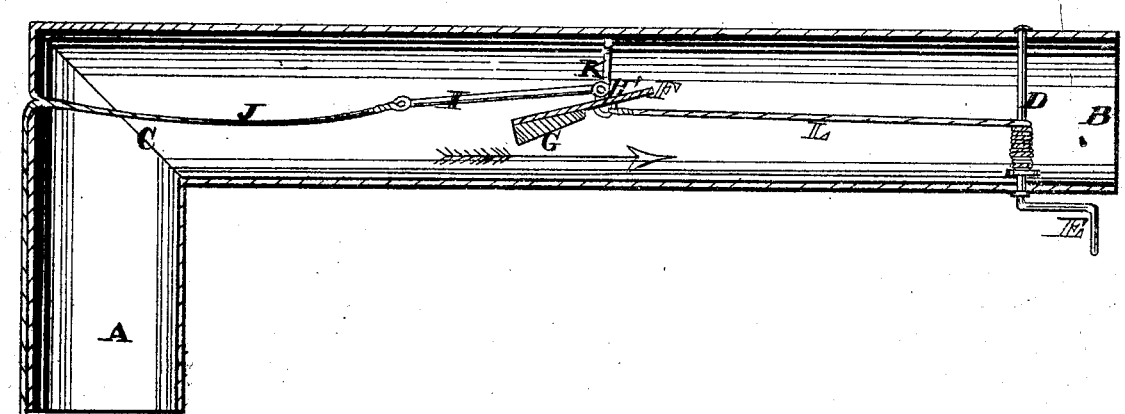
Figure 2 represents the same, with the scraper being drawn back to its first position.
Figure 3:
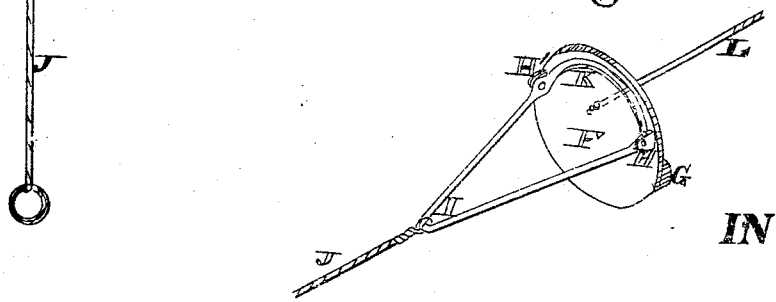
Figure 3 is a perspective view of the scraper detached.

A is a vertical, and B a horizontal portion of a stove-pipe, the said portions being joined by a customary elbow, C. D is a rod or stout wire passed diametrically through the pipe, and terminating outside of the pipe in a crank, E. The scraper proper consists of a disk, F, which may be of cast or stout sheet iron. Attached to one part of the disk F is a weight, G, in order to give that part a preponderance, and give the disk a tendency to assume a position transverse to the pipe. Projecting from the light or unloaded side of the disk are two eyes or loops H H', for the engagement of a bail, I, for the attachment of a chain, J, that is carried out through the pipe-elbow. Extending in a plane at right angles from the bail proper is a bow, K, which, when the scraper is in operation, prevents the disk falling out of a vertical plane, and co-acts with the drag of the chain on the bail, and with the weight upon the other portion of the disk, to maintain the disk in a vertical position in the act of scraping. Attached also to the light portion of the disk, but on the obverse side, is another chain, L, which, being carried forward in the pipe, has its other extremity made fast to the rod D. The chain L being attached to the light portion of the disk, rotation of the rod acts to throw the said disk with its plane nearly coincident with the axis of the pipe, (see fig. 2,) and to draw it forward to close proximity with the rod, where it remains in nearly horizontal position, so as to afford an unobstructed passage for the smoke.

When it is desired to clear out the pipe, the operator grasps the chain J and draws it through the hole in the pipe-elbow. This draught on the chain causes the disk to assume the vertical position, so as to act as an effective scraper to dislodge and remove the debris or accumulations. This having been effected, the disk is drawn back to its resting-position, as already stated.

I claim herein as new, and of my invention—

The provision in a stove-pipe of the crank-rod D, loaded disk F, bail I K, and chains J and L, the whole being arranged and adapted to operate as set forth.

In testimony of which invention I hereunto set my hand.

WARREN J. NACE.

Witnesses:
C. T. BOWER,
D. W. BOWER.